US012571650B2

(12) United States Patent
Tanaka

(10) Patent No.: US 12,571,650 B2
(45) Date of Patent: Mar. 10, 2026

(54) APPARATUS, METHOD, AND COMPUTER PROGRAM FOR UPDATING MAP

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 17/839,658

(22) Filed: Jun. 14, 2022

(65) Prior Publication Data

US 2022/0404170 A1 Dec. 22, 2022

(30) Foreign Application Priority Data

Jun. 22, 2021 (JP) ................................. 2021-103098

(51) Int. Cl.
*G01C 21/00* (2006.01)

(52) U.S. Cl.
CPC ..... *G01C 21/3859* (2020.08); *G01C 21/3822* (2020.08); *G01C 21/387* (2020.08)

(58) Field of Classification Search
CPC ............ G01C 21/3859; G01C 21/3822; G01C 21/387
See application file for complete search history.

(56) References Cited

U.S. PATENT DOCUMENTS

| | | | | |
|---|---|---|---|---|
| 8,527,199 | B1 * | 9/2013 | Burnette | ............ G01C 21/3848 |
| | | | | 701/425 |
| 11,815,362 | B2 * | 11/2023 | Nomura | ................. G09B 29/00 |

| | | | | |
|---|---|---|---|---|
| 2016/0019419 | A1 * | 1/2016 | Chen | .................. G01C 21/3807 |
| | | | | 382/113 |
| 2016/0161265 | A1 * | 6/2016 | Bagheri | ................. G01S 13/89 |
| | | | | 701/450 |
| 2017/0277716 | A1 | 9/2017 | Giurgiu et al. | |
| 2020/0041285 | A1 * | 2/2020 | Kato | ................... G09B 29/007 |
| 2020/0249032 | A1 * | 8/2020 | Lee | ...................... G09B 29/006 |

(Continued)

FOREIGN PATENT DOCUMENTS

| | | | | |
|---|---|---|---|---|
| CN | 107228676 | A | 10/2017 | |
| CN | 110888434 | A * | 3/2020 | ........... G05D 1/0221 |

(Continued)

OTHER PUBLICATIONS

English Machine Translation of CN-110888434-A, 2020, 57 pages, provided by EPO.*

*Primary Examiner* — Adam M Queler
*Assistant Examiner* — David Faber
(74) *Attorney, Agent, or Firm* — Sughrue Mion, PLLC

(57) ABSTRACT

The present disclosure is directed to improved map updating. Feature data is received from a vehicle traveling on a predetermined road section for a feature in a road section related to travel of vehicles. The feature data indicates a position of the feature. An accuracy of the position of the feature is measured based on a difference between the position of the feature and a reference position of a corresponding feature. A determination is made whether the accuracy satisfies a predetermined accuracy condition, and a contribution of the feature data is set to update of map information indicating the position of the feature. The contribution is adjusted based on whether the accuracy satisfied the accuracy condition.

7 Claims, 7 Drawing Sheets

(56)  References Cited

U.S. PATENT DOCUMENTS

| | | | |
|---|---|---|---|
| 2021/0140771 | A1 | 5/2021 | Igarashi |
| 2021/0156698 | A1* | 5/2021 | Koda ..................... G09B 29/10 |
| 2021/0247204 | A1* | 8/2021 | Nomura .............. G08G 1/0969 |
| 2021/0372814 | A1* | 12/2021 | Igarashi ............. G01C 21/3461 |
| 2022/0113162 | A1* | 4/2022 | Nomura ................. G09B 29/00 |
| 2022/0172616 | A1* | 6/2022 | Xu ..................... G01C 21/3691 |
| 2022/0351612 | A1 | 11/2022 | Asahara et al. |
| 2023/0017969 | A1* | 1/2023 | Mortier .............. B60W 60/001 |
| 2023/0100814 | A1* | 3/2023 | Ren ...................... B60W 40/04 |
| | | | 701/301 |

FOREIGN PATENT DOCUMENTS

| | | | |
|---|---|---|---|
| JP | 2019-168984 | A | 10/2019 |
| JP | 2020-91252 | A | 6/2020 |
| JP | 6762457 | B1 | 9/2020 |
| JP | 2021-76475 | A | 5/2021 |
| WO | 2017/212639 | A1 | 12/2017 |
| WO | 2018/181974 | A1 | 10/2018 |
| WO | 2019188886 | A1 | 10/2019 |
| WO | 2021/002190 | A1 | 1/2021 |

* cited by examiner

FIG. 7

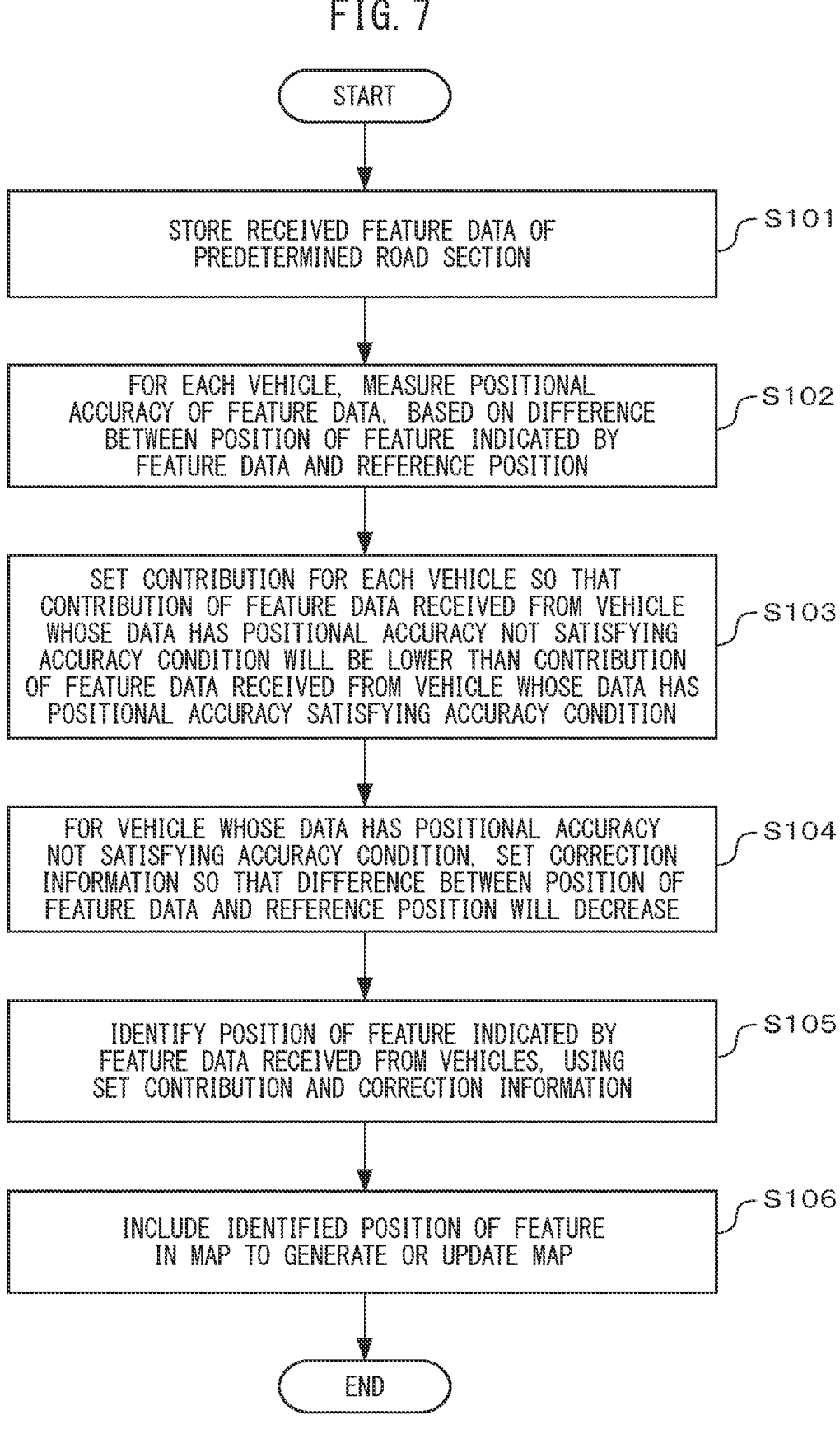

START

STORE RECEIVED FEATURE DATA OF
PREDETERMINED ROAD SECTION            S101

FOR EACH VEHICLE, MEASURE POSITIONAL
ACCURACY OF FEATURE DATA, BASED ON DIFFERENCE
BETWEEN POSITION OF FEATURE INDICATED BY
FEATURE DATA AND REFERENCE POSITION            S102

SET CONTRIBUTION FOR EACH VEHICLE SO THAT
CONTRIBUTION OF FEATURE DATA RECEIVED FROM VEHICLE
WHOSE DATA HAS POSITIONAL ACCURACY NOT SATISFYING
ACCURACY CONDITION WILL BE LOWER THAN CONTRIBUTION
OF FEATURE DATA RECEIVED FROM VEHICLE WHOSE DATA HAS
POSITIONAL ACCURACY SATISFYING ACCURACY CONDITION            S103

FOR VEHICLE WHOSE DATA HAS POSITIONAL ACCURACY
NOT SATISFYING ACCURACY CONDITION, SET CORRECTION
INFORMATION SO THAT DIFFERENCE BETWEEN POSITION OF
FEATURE DATA AND REFERENCE POSITION WILL DECREASE            S104

IDENTIFY POSITION OF FEATURE INDICATED BY
FEATURE DATA RECEIVED FROM VEHICLES, USING
SET CONTRIBUTION AND CORRECTION INFORMATION            S105

INCLUDE IDENTIFIED POSITION OF FEATURE
IN MAP TO GENERATE OR UPDATE MAP            S106

END

APPARATUS, METHOD, AND COMPUTER PROGRAM FOR UPDATING MAP

FIELD

The present invention relates to an apparatus, a method, and a computer program for updating a map.

BACKGROUND

High-precision maps to which an autonomous vehicle-driving system refers for autonomous driving control of a vehicle are required to accurately represent information on those features on or around roads which relate to travel of vehicles. Thus, a technique to collect data representing features from vehicles actually traveling on roads has been proposed (see International Publication No. 2017/212639).

In the technique disclosed in International Publication No. 2017/212639, a server device includes a storage unit that stores an advanced map including feature information on features. The server device receives difference information indicating the difference between feature information and an actual feature corresponding to the feature information from vehicle-mounted devices each equipped with an external sensor for measuring features. The server device transmits a raw-data request signal for requesting transmission of raw measurement data of an actual feature to a vehicle-mounted device, depending on reliability calculated on the basis of multiple pieces of difference information.

SUMMARY

To record the accurate position of a feature in a map on the basis of collected feature-representing data, vehicles that generate the feature-representing data are required to accurately estimate the position of the feature. However, the positional accuracy of a feature represented in such data generated by some vehicles may be low, or the positional accuracy may vary from vehicle to vehicle. If collected data representing a feature with low positional accuracy is used for updating a map, the positional accuracy of the feature represented in the map may decrease.

It is an object of the present invention to provide an apparatus for updating a map that can improve the positional accuracy of a feature represented in the map.

According to an embodiment, an apparatus for updating a map is provided. The apparatus includes one or more processors configured to: receive feature data from a vehicle traveling on a predetermined road section for a feature in the road section related to travel of vehicles via a communication circuit capable of communicating with the vehicle, the feature data indicating the position of the feature, measure the accuracy of the position of the feature indicated by feature data obtained by the vehicle, based on the difference between the position of the feature indicated by the received feature data and a reference position of a corresponding feature, determine whether the accuracy satisfies a predetermined accuracy condition, and set contribution of the feature data received from the vehicle to update of map information indicating the position of the feature. The contribution is set lower when the accuracy does not satisfy the accuracy condition than when the accuracy satisfies the accuracy condition.

Preferably, for a model of vehicle, the processors of the apparatus measure the accuracy of the position of the feature, based on the difference between the position of the feature indicated by the individual feature data received from a plurality of vehicles belonging to the model and the reference position of a corresponding feature, the plurality of vehicles traveling on the predetermined road section, and set the contribution for each model of vehicle, based on the accuracy of the position of the feature regarding the model of vehicle.

Preferably, the feature data further includes information indicating environment around the vehicle at the time of generation of the feature data; the processors of the apparatus measure the accuracy depending on the environment regarding the vehicle, and set the contribution depending on the environment, based on the accuracy depending on the environment regarding the vehicle.

The processors are preferably further configured to: set correction information for correcting the position of the feature indicated by feature data obtained by the vehicle. The correction information is set so that the difference between the position of the feature indicated by the received feature data and the reference position of a corresponding feature will decrease.

According to another embodiment, a method for updating a map is provided. The method includes receiving feature data from a vehicle traveling on a predetermined road section for a feature in the road section related to travel of vehicles via a communication circuit capable of communicating with the vehicle, the feature data indicating the position of the feature; measuring the accuracy of the position of the feature indicated by feature data obtained by the vehicle, based on the difference between the position of the feature indicated by the received feature data and a reference position of a corresponding feature; determining whether the accuracy satisfies a predetermined accuracy condition; and setting contribution of the feature data received from the vehicle to update of map information indicating the position of the feature. The contribution is set lower when the accuracy does not satisfy the accuracy condition than when the accuracy satisfies the accuracy condition.

According to still another embodiment, a non-transitory recording medium that stores a computer program for updating a map is provided. The computer program includes instructions causing a computer to execute a process including: receiving feature data from a vehicle traveling on a predetermined road section for a feature in the road section related to travel of vehicles via a communication circuit capable of communicating with the vehicle, the feature data indicating the position of the feature; measuring the accuracy of the position of the feature indicated by feature data obtained by the vehicle, based on the difference between the position of the feature indicated by the received feature data and a reference position of a corresponding feature; determining whether the accuracy satisfies a predetermined accuracy condition; and setting contribution of the feature data received from the vehicle to update of map information indicating the position of the feature. The contribution is set lower when the accuracy does not satisfy the accuracy condition than when the accuracy satisfies the accuracy condition.

The apparatus according to the present invention has an advantageous effect of being able to improve the positional accuracy of a feature represented in a map.

BRIEF DESCRIPTION OF DRAWINGS

FIG. 7 is an operation flowchart of the map update process.

DESCRIPTION OF EMBODIMENTS

An apparatus for updating a map, a method for updating a map executed by the apparatus, and a computer program for updating a map will now be described with reference to the attached drawings. Regarding a region represented in a map to be generated or updated, the apparatus collects data representing a feature related to travel of vehicles (hereafter, "feature data") from multiple vehicles that can communicate.

The feature data includes information indicating the position of a feature represented in the data. To estimate the position of a feature, information on parameters of a vehicle-mounted camera for capturing features, such as the height of the mounted position and the imaging direction of the camera, is used. The parameter information of the camera is stored in a vehicle-mounted memory, for example, before shipment on a vehicle-by-vehicle basis. However, the height of the mounted position may vary, for example, because of a change of a tire of the vehicle or time-dependent deterioration of its suspension. If the parameter information is not updated despite occurrence of such variation, the estimation accuracy of the positions of features will decrease. The same holds true for the case that the parameter information of the camera is incorrectly set. For this reason, to improve the positional accuracy of features represented in the map, it is desirable to evaluate the estimation accuracy of the positions of features for each vehicle.

Thus the apparatus collects feature data including an estimated position of a feature in a predetermined road section, where the position of the feature is determined in advance with high accuracy, from individual vehicles traveling on the road section. For each vehicle, the apparatus calculates the difference between the estimated position of the feature indicated by individual feature data and the position of a corresponding feature (hereafter, a "reference position") among features whose positions are prestored (hereafter, "reference features"). Based on this difference, the apparatus measures the accuracy of the position of the feature indicated by feature data obtained by the vehicle, and determines whether the positional accuracy satisfies a predetermined accuracy condition. The apparatus then makes contribution to update of map information of feature data received from a vehicle whose data has positional accuracy not satisfying the accuracy condition be lower than contribution of feature data received from a vehicle whose data has positional accuracy satisfying the accuracy condition.

Features to be detected include various signposts, various road markings, traffic lights, and other features related to travel of vehicles.

Figure 1:
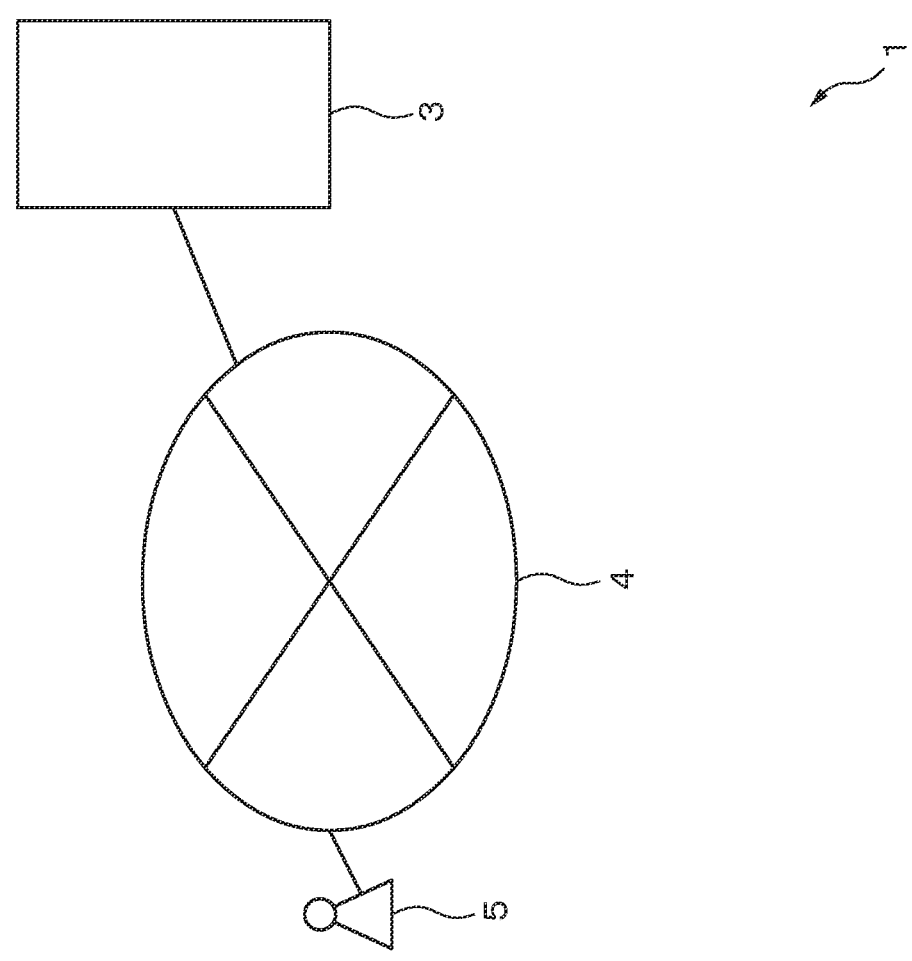
FIG. 1 schematically illustrates the configuration of a map update system equipped with an apparatus for updating a map.
Figure 1:
Figure 1:
Figure 1:
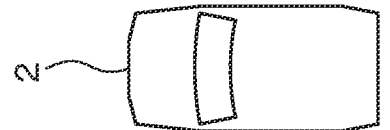

FIG. 1 schematically illustrates the configuration of a map update system equipped with the apparatus for updating a map. In the present embodiment, the map update system 1 includes multiple vehicles 2 and a server 3, which is an example of the apparatus for updating a map. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2. However, as understood by one of ordinary skill in the art, the embodiments of the present disclosure may be directed to multiple vehicles. FIG. 1 also illustrates only a single wireless base station 5, but the communication network 4 may be connected with multiple wireless base stations 5. Additionally, the server 3 may be connected to a traffic information server (not illustrated) that manages traffic information so that they can communicate via the communication network.

In the present embodiment, the vehicles 2 have the same configuration and functions concerning collection of feature data. Thus the following describes a single vehicle 2.

Figure 2:
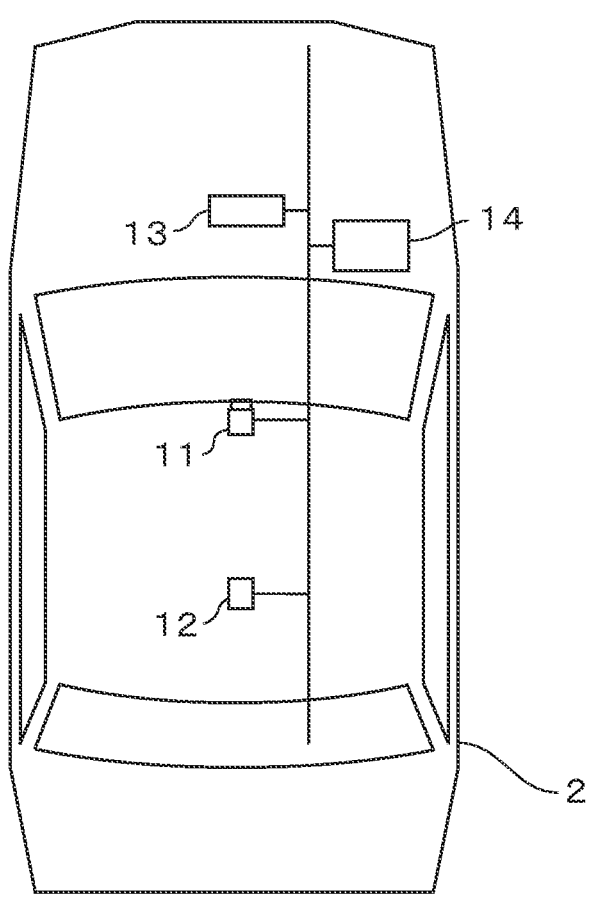
FIG. 2 schematically illustrates the configuration of a vehicle.

FIG. 2 schematically illustrates the configuration of a vehicle 2. The vehicle 2 includes a camera 11, a GPS receiver 12, a wireless communication terminal 13, and a data acquisition device 14, which are connected so that they can communicate via an in-vehicle network conforming to a standard, such as a controller area network. The vehicle 2 may further include a navigation device (not illustrated) for searching for a planned travel route of the vehicle 2 and for navigating so that the vehicle 2 may travel along the planned travel route.

The camera 11, which is an example of an image capturing unit for capturing the surroundings of the vehicle 2, includes a two-dimensional detector constructed from an array of optoelectronic transducers, such as CCD or C-MOS, having sensitivity to visible light and a focusing optical system that forms an image of a target region on the two-dimensional detector. The camera 11 is mounted, for example, in the interior of the vehicle 2 so as to be oriented, for example, to the front of the vehicle 2. The camera 11 captures a region in front of the vehicle 2 every predetermined capturing period (e.g., $1/30$ to $1/10$ seconds), and generates images of this region. The images obtained by the camera 11 may be color or grayscale images. The vehicle 2 may include multiple cameras 11 whose imaging directions or focal lengths differ.

Whenever generating an image, the camera 11 outputs the generated image to the data acquisition device 14 via the in-vehicle network.

The GPS receiver 12 receives GPS signals from GPS satellites at predetermined intervals, and determines the position of the vehicle 2, based on the received GPS signals. The GPS receiver 12 outputs positioning information indicating the result of determination of the position of the vehicle 2 based on the GPS signals to the data acquisition device 14 via the in-vehicle network at predetermined intervals. The vehicle 2 may include a receiver conforming to a satellite positioning system other than the GPS receiver 12. In this case, this receiver determines the position of the vehicle 2.

The wireless communication terminal 13, which is an example of a communication unit, is a device to execute a wireless communication process conforming to a predetermined standard of wireless communication, and accesses, for example, the wireless base station 5 to connect to the server 3 via the wireless base station 5 and the communication network 4. The wireless communication terminal 13 generates an uplink radio signal including, for example, feature data received from the data acquisition device 14, and transmits the uplink radio signal to the wireless base station 5 to transmit, for example, the feature data to the server 3. Additionally, the wireless communication terminal 13 receives a downlink radio signal from the wireless base station 5, and passes, for example, a collection instruction from the server 3 included in the radio signal to the data acquisition device 14 or to an electronic control unit (ECU) (not illustrated) that controls travel of the vehicle 2.

Figure 3:
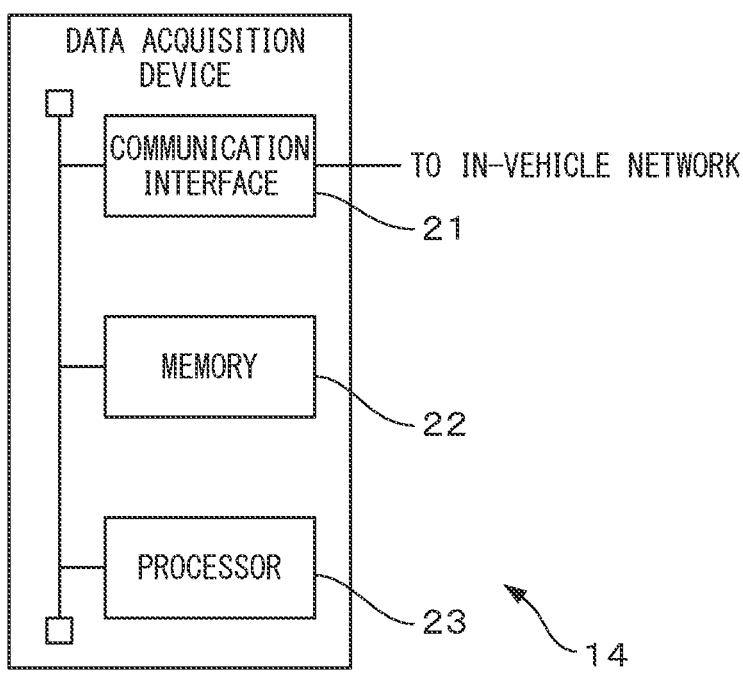
FIG. 3 illustrates the hardware configuration of a data acquisition device.

FIG. 3 illustrates the hardware configuration of the data acquisition device. The data acquisition device 14 generates feature data, based on an image generated by the camera 11, and further generates travel information of the vehicle 2. To achieve this, the data acquisition device 14 includes a communication interface 21, a memory 22, and a processor 23.

The communication interface 21, which is an example of an in-vehicle communication unit, includes an interface circuit for connecting the data acquisition device 14 to the in-vehicle network. In other words, the communication interface 21 is connected to the camera 11, the GPS receiver 12, and the wireless communication terminal 13 via the in-vehicle network. Whenever receiving an image from the camera 11, the communication interface 21 passes the received image to the processor 23. Whenever receiving positioning information from the GPS receiver 12, the communication interface 21 passes the received positioning information to the processor 23. Additionally, the communication interface 21 outputs feature data received from the processor 23 to the wireless communication terminal 13 via the in-vehicle network.

The memory 22 includes, for example, volatile and non-volatile semiconductor memories. The memory 22 may further include other storage, such as a hard disk drive. The memory 22 stores various types of data used in a process related to generation of feature data, which is executed by the processor 23 of the data acquisition device 14. Such data includes, for example, a road map; identifying information of the vehicle 2; parameters of the camera 11, such as the height of the mounted position, the imaging direction, and the angle of view of the camera 11; and a set of parameters for defining a classifier for detecting a feature from an image. The road map may be, for example, a map used by the navigation device, and includes information on the positions and the lengths of road sections included in the region represented in the road map as well as the connection relationship between road sections at individual intersections in this region. The memory 22 may also stores images received from the camera 11 and positioning information received from the GPS receiver 12 for a certain period. Additionally, the memory 22 stores information indicating a target region for generating and collecting feature data (hereafter, a "collection target region") specified in a collection instruction to collect feature data. The memory 22 may further store computer programs for various processes executed by the processor 23.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 stores images received from the camera 11 and positioning information received from the GPS receiver 12 in the memory 22. Additionally, the processor 23 executes the process related to generation of feature data at predetermined intervals (e.g., 0.1 to 10 seconds) during travel of the vehicle 2.

As the process related to generation of feature data, for example, the processor 23 determines whether the position of the vehicle 2 indicated by positioning information received from the GPS receiver 12 is within a collection target region. When the position of the vehicle is within a collection target region, the processor 23 generates feature data, based on an image received from the camera 11.

For example, the processor 23 inputs an image received from the camera 11 into a classifier that has been trained to detect a detection target feature, thereby detecting the feature represented in the inputted image (hereafter simply the "input image"). The processor 23 generates information indicating the type of the detected feature as feature data. As such a classifier, the processor 23 may use, for example, a deep neural network (DNN) that has been trained to detect from an input image a feature represented in the image. As such a DNN, for example, a DNN having a convolutional neural network (CNN) architecture, e.g., Single Shot MultiBox Detector (SSD) or Faster R-CNN, is used. In this case, for each type of detection target feature (e.g., a lane-dividing line, a pedestrian crossing, and a stop line), the classifier calculates a confidence score indicating how likely the feature is represented in a region in the input image; the classifier calculates the confidence score for each of various regions in the input image. The classifier determines that the region where the confidence score for a certain type of feature is not less than a predetermined detection threshold represents this type of feature. The classifier then outputs information indicating a region including a detection target feature in the input image, e.g., a circumscribed rectangle of the detection target feature (hereafter, an "object region") and information indicating the type of the feature represented in the object region. The processor 23 generates feature data so as to include the information indicating the type of the feature represented in the detected object region.

Additionally, the processor 23 identifies the real-space position of a feature indicated by feature data, and includes information indicating this position in the feature data. The positions of pixels in an image correspond one-to-one to the directions from the camera 11 to objects represented in the respective pixels. Thus the processor 23 estimates the position of a feature represented in an object region in the image, based on the direction from the camera 11 to the position corresponding to the centroid of the object region, the position and the travel direction of the vehicle 2 at the time of generation of the image used for generating the feature data, and the parameters of the camera 11. To this end, the processor 23 can use the position indicated by positioning information received from the GPS receiver 12 at the timing closest to the time of generation of the image used for generating the feature data as the position of the vehicle 2. Alternatively, in the case that the ECU (not illustrated) estimates the position of the vehicle 2, the processor 23 may obtain information indicating the estimated position of the vehicle 2 from the ECU via the communication interface 21. The processor 23 further obtains information indicating the travel direction of the vehicle 2 from the ECU. Alternatively, the processor 23 may estimate the position of a feature indicated by feature data by "structure from motion (SfM)." In this case, the processor 23 associates object regions representing the same feature in two images obtained at different timings with each other, using optical flow. The processor 23 can estimate the position of the feature by triangulation, based on the positions and the travel directions of the vehicle 2 at the times of acquisition of the two images, the parameters of the camera 11, and the positions of the object regions in the respective images.

The processor 23 includes, in feature data, the latitude and longitude indicating the position of the feature represented in the feature data as information indicating the position of the feature represented in the feature data. Additionally, the processor 23 refers to the road map to identify a link that is a road section including the position of the feature represented in the feature data or a road section closest to this position. The processor 23 then includes the identification number of the identified link in the feature data.

The processor 23 further includes the identifying information of the vehicle 2 in feature data. The processor 23 may also include, in the feature data, information used for estimating the position of the feature, e.g., the parameters of the camera 11 and the position of the feature in the image. Additionally, the processor 23 may include, in the feature data, the position and the travel direction of the vehicle 2 at the time of generation of the feature data, which are used for estimating the position of the feature, as well as the intensity of received GPS signals used for determining the position of the vehicle 2. The processor 23 may further include, in the feature data, an image itself generated by the camera 11 or a sub-image obtained by cutting out a region representing a road surface from the image. Whenever generating feature data, the processor 23 outputs the generated feature data to the wireless communication terminal 13 via the communication interface 21. In this way, feature data is transmitted to the server 3. The processor 23 may transmit the information used for estimating the position of the feature to the server 3 via the wireless communication terminal 13 together with the identifying information of the vehicle 2 separately from the feature data.

The following describes the server 3, which is an example of the apparatus for updating a map.

Figure 4:
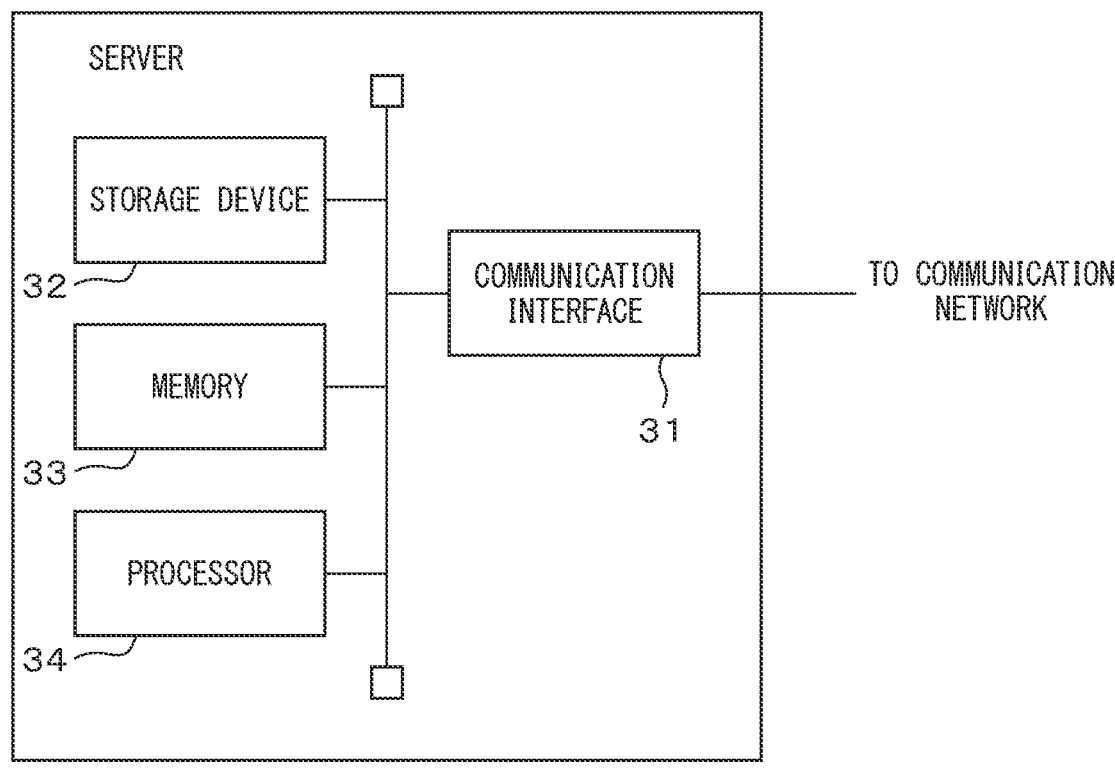
FIG. 4 illustrates the hardware configuration of a server, which is an example of the apparatus for updating a map.

FIG. 4 illustrates the hardware configuration of the server 3, which is an example of the apparatus for updating a map. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of the communication unit, includes an interface circuit for connecting the server 3 to the communication network 4. The communication interface 31 is configured so that it can communicate with the vehicles 2 via the communication network 4 and the wireless base station 5. More specifically, the communication interface 31 passes to the processor 34 feature data received from the vehicles 2 via the wireless base station 5 and the communication network 4. Additionally, the communication interface 31 transmits a collection instruction received from the processor 34 to the vehicles 2 via the communication network 4 and the wireless base station 5.

The storage device 32, which is an example of a storage unit, includes, for example, a hard disk drive, or an optical recording medium and an access device therefor. The storage device 32 stores various types of data and information used in a process for collecting map data. For example, the storage device 32 stores a map to be updated and a reference position of each of one or more reference features in a predetermined road section; the reference position will serve as a reference for estimating the positional accuracy of features for each vehicle 2. Details of the predetermined road section and the reference position will be described below. Additionally, the storage device 32 stores the identifying information of each vehicle 2 and feature data received from each vehicle 2. The storage device 32 may further store information used by each vehicle 2 for estimating the position of a feature and a computer program executed by the processor 34 for executing a map update process.

The memory 33, which is another example of a storage unit, includes, for example, nonvolatile and volatile semiconductor memories. The memory 33 temporarily stores various types of data generated during execution of the map update process.

The processor 34, which is an example of a control unit, includes one or more central processing units (CPUs) and a peripheral circuit thereof. The processor 34 may further include another operating circuit, such as a logic-arithmetic unit or an arithmetic unit. The processor 34 executes the map update process.

Figure 5:
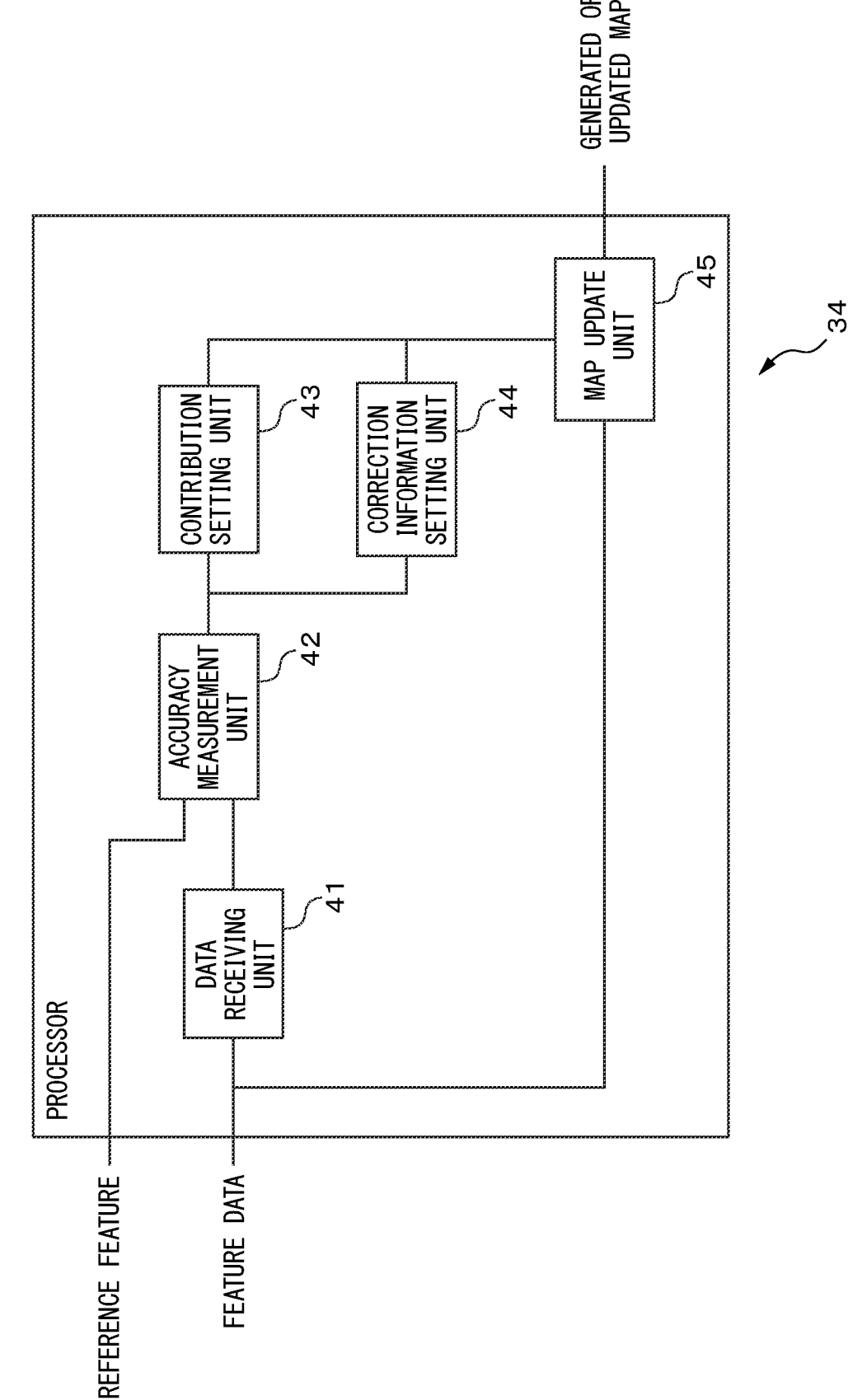
FIG. 5 is a functional block diagram of a processor of the server, related to a map update process.

FIG. 5 is a functional block diagram of the processor 34, related to the map update process. The processor 34 includes a data receiving unit 41, an accuracy measurement unit 42, a contribution setting unit 43, a correction information setting unit 44, and a map update unit 45. These units included in the processor 34 are functional modules, for example, implemented by a computer program executed by the processor 34, or may be dedicated operating circuits provided in the processor 34.

The data receiving unit 41 receives feature data representing each feature in a predetermined road section from some of the vehicles 2 traveling on the road section via the wireless base station 5, the communication network 4, and the communication interface 31. The data receiving unit 41 stores the received feature data in the memory 33 or the storage device 32. To determine whether the feature data represents a feature in the predetermined road section, the data receiving unit 41 refers to the identification number of the link of the road section included in the feature data. When the identification number of the link included in the feature data matches that of the link corresponding to the predetermined road section, the data receiving unit 41 determines that the feature data represents a feature in the predetermined road section.

As described above, the feature data may include an image itself generated by the camera 11 or a sub-image. In this case, the data receiving unit 41 may detect the position of a feature by executing, on the image or the sub-image, the same process as is executed by the processor 23 of the data acquisition device 14 for detecting the position of a feature.

The accuracy measurement unit 42 calculates, for each vehicle 2, the difference between the position of a feature indicated by individual feature data of the predetermined road section received from the vehicle 2 and the reference position of a corresponding reference feature stored in the server 3. The accuracy measurement unit 42 then measures the accuracy of the position of a feature indicated by feature data obtained by the vehicle 2, based on the difference in the position of the feature indicated by the individual feature data.

In the present embodiment, the predetermined road section may be a road section where the position of each feature therein is determined with high accuracy. For example, the predetermined road section may be a road section in an expressway regarding which it is confirmed that the positional accuracy of each feature represented in the map is high, e.g., it is confirmed that road construction has not been performed since the last update of the map. In the case that the position of each feature in the map is expressed as a probability distribution of reliability of the position, the predetermined road section may be a section where the extent of the probability distribution is not greater than a certain extent for each feature and the accuracy of satellite positioning is not less than a predetermined accuracy threshold. The extent of the probability distribution is expressed as, for example, variance values in predetermined directions (e.g., the lengthwise direction of the road section and the direction perpendicular to the lengthwise direction).

For individual feature data of the predetermined road section received from a vehicle 2 of interest, the accuracy measurement unit 42 determines a reference feature of the same type as and closest to the feature represented in the feature data as a reference feature corresponding to the feature represented in the feature data. For each feature represented in the individual feature data of the predetermined road section received from the vehicle 2 of interest, the accuracy measurement unit 42 then calculates the distance and the direction from the reference position of the corresponding reference feature to the position of the feature. The accuracy measurement unit 42 calculates the average of the absolute values or the root mean square of distances calculated for the individual feature data as an accuracy index indicating the positional accuracy of feature data obtained by the vehicle 2 of interest. In the case that the position of each feature is expressed as a probability distribution of reliability of the position, the distance from a reference position to the position of a feature indicated by feature data may be expressed as a Mahalanobis distance. For the individual feature data, the accuracy measurement unit 42 further calculates the angle between the travel direction of the vehicle 2 at the time of generation of the feature data and the direction from the reference position of the reference feature to the position of the feature indicated by the feature data (hereafter, the "angle error"). The accuracy measurement unit 42 uses the angle error and the distance calculated for the individual feature data as correction indices for correcting the position of a feature regarding the vehicle 2 of interest. The accuracy measurement unit 42 can calculate accuracy indices and correction indices for the respective vehicles 2 by executing the above-described process for each vehicle 2.

Figure 6A:
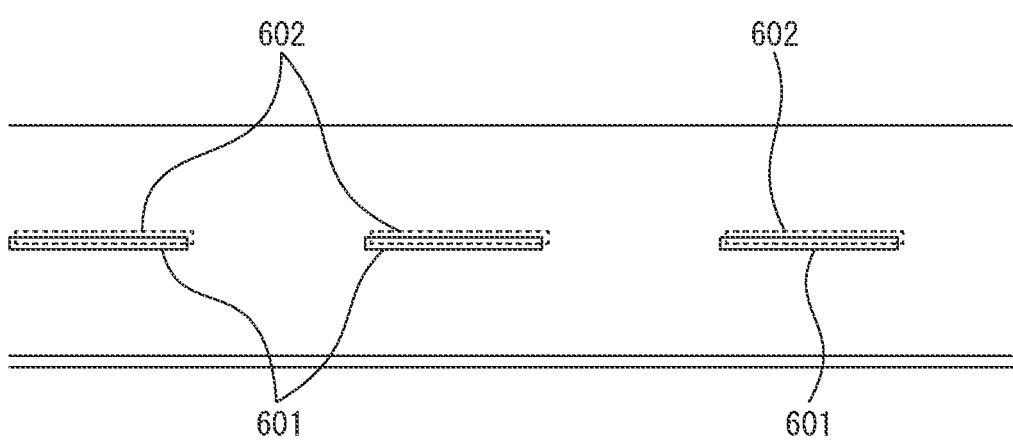
FIG. 6A illustrates an example of the relationship between the position of a feature indicated by feature data obtained by a vehicle whose feature data has relatively high positional accuracy and that of a corresponding reference feature.
Figure 6B:
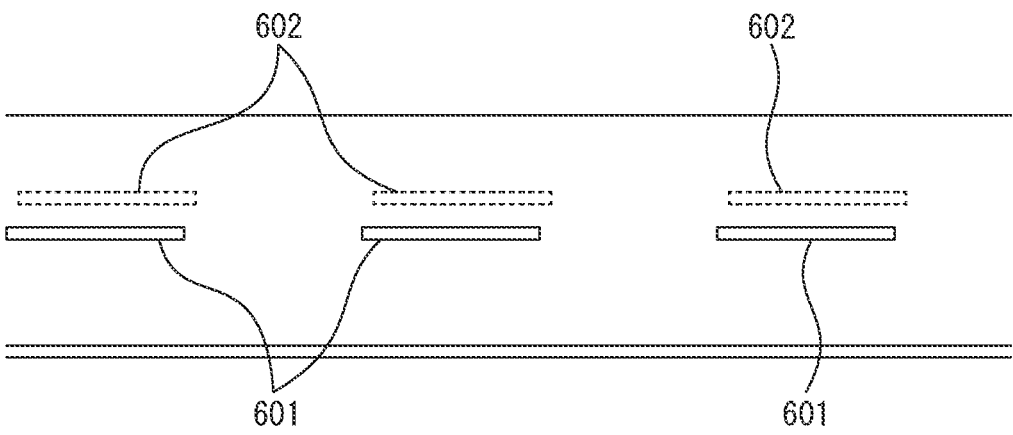
FIG. 6B illustrates an example of the relationship between the position of a feature indicated by feature data obtained by a vehicle whose feature data has relatively low positional accuracy and that of a corresponding reference feature.

FIG. 6A illustrates an example of the relationship between the position of a feature indicated by feature data obtained by a vehicle 2 whose feature data has relatively high positional accuracy and that of a corresponding reference feature. FIG. 6B illustrates an example of the relationship between the position of a feature indicated by feature data obtained by a vehicle 2 whose feature data has relatively low positional accuracy and that of a corresponding reference feature. In FIGS. 6A and 6B, the reference feature is a road marking depicted by solid lines.

As illustrated in FIG. 6A, when the positional accuracy of feature data is relatively high, the position of a corresponding feature 602 indicated by feature data is sufficiently close to the reference position of a reference feature 601. In contrast, as illustrated in FIG. 6B, when the positional accuracy of feature data is relatively low, the distance between the reference position of the reference feature 601 and the position of the corresponding feature 602 indicated by feature data is longer. As illustrated in FIGS. 6A and 6B, feature 601 points to a solid rectangle, and feature 602 points to a dotted rectangle.

The accuracy measurement unit 42 notifies the contribution setting unit 43 of the accuracy index calculated for each vehicle 2. The accuracy measurement unit 42 also notifies the correction information setting unit 44 of the accuracy index and the correction indices calculated for each vehicle 2.

The contribution setting unit 43 sets, for each vehicle 2, contribution of feature data received from the vehicle 2 to update of the map, based on the accuracy index received from the accuracy measurement unit 42. In the present embodiment, for each vehicle 2, contribution of feature data received from the vehicle 2 when the positional accuracy of a feature included in feature data, which is indicated by the accuracy index, does not satisfy an accuracy condition, is set lower than contribution of feature data received from the vehicle 2 when the positional accuracy satisfies the accuracy condition. Thus, contribution of feature data received from a vehicle whose data has positional accuracy satisfying the accuracy condition will be higher than contribution of feature data received from another vehicle whose data has positional accuracy not satisfying the accuracy condition. As a result, the position of a feature indicated by feature data received from a vehicle whose data has positional accuracy satisfying the accuracy condition will be particularly reflected in the map, which improves the positional accuracy of features represented in the map.

The accuracy condition is set, for example, so that the positional error of features represented in the map updated using feature data whose positional accuracy satisfies the accuracy condition will be within a tolerable range for autonomous driving control of a vehicle. In the case that the accuracy index is expressed as the average of the absolute values or the root mean square of distances between features represented in individual feature data and corresponding reference features as described above, the accuracy condition is that the value of the accuracy index is not greater than a tolerable positional error of features (e.g., ten to several tens of centimeters) or the value corresponding to its square. In the case that the position of each feature in the map is expressed as a probability distribution of reliability of the position, the accuracy condition may be that the value of the accuracy index is not greater than a predetermined distance threshold expressed as a Mahalanobis distance.

The contribution setting unit 43 assigns a first contribution (e.g., 1.0) to some of the vehicles 2 whose feature data has positional accuracy satisfying the accuracy condition. The contribution setting unit 43 assigns a second contribution (e.g., 0.0 to 0.5), which is lower than the first contribution, to the other vehicles 2 whose feature data has positional accuracy not satisfying the accuracy condition. The contribution setting unit 43 may decrease the second contribution as the difference between the value of the accuracy index and the accuracy condition increases.

The contribution setting unit 43 notifies the map update unit 45 of the contribution set for each vehicle 2.

The correction information setting unit 44 sets, for each vehicle 2 whose data has positional accuracy not satisfying the accuracy condition, correction information for correcting the position of a feature of feature data received from the vehicle 2.

The positional accuracy of feature data depends on the accuracy of parameters used for estimating the position of a feature indicated by feature data. In the present embodiment, the real-space position of a feature is estimated on the basis of the position of the feature in an image generated by the camera 11 mounted on the vehicle 2 and the position of the vehicle 2. For this reason, parameters of the camera 11, such as the imaging direction and the height of the mounted position of the camera 11, and the intensity of GPS signals affect the positional accuracy of the feature data. In particular, the more the parameter values of the camera 11 stored in the data acquisition device 14 of the vehicle 2 deviate from their actual values, the more the positional accuracy of feature data decreases. For example, as described above, the height of the mounted position of the camera 11 may vary because of a change of a tire of the vehicle 2 or time-dependent deterioration of its suspension, resulting in deviation of the parameters values of the camera 11 stored in the data acquisition device 14 from their actual values.

When the parameters of the camera 11 values, such as the imaging direction or the height of the mounted position of the camera 11, deviate from their actual values, the position of a feature indicated by feature data will deviate from its actual position in the direction and by the distance depending on the deviation. Thus the correction information setting unit 44 sets the correction information so as to decrease the difference between the position of a feature indicated by feature data of the predetermined road section and the reference position of a corresponding reference feature. In this example, the correction information setting unit 44 calculates the average of the angle errors and that of the distances expressed as the correction indices regarding the individual feature data. The correction information setting unit 44 then sets, in the correction information, the angle opposite to the average of the angle errors relative to the travel direction of the vehicle 2 as well as the average of the distances.

The correction information setting unit 44 notifies the map update unit 45 of the correction information set for the vehicles 2 whose data has positional accuracy not satisfying the accuracy condition.

The map update unit 45 generates or updates the map read from the storage device 32, based on feature data collected from the vehicles 2. For example, among the features represented by individual feature data, the map update unit 45 selects features of the same type located within a predetermined range as feature data representing the same feature. In the case that the position of each feature is expressed as a probability distribution of reliability of the position, the predetermined range may be expressed as a Mahalanobis distance. The map update unit 45 weights the positions of the feature included in the individual feature data representing the same feature with the contribution set for the vehicles 2 that have generated the feature data, averages these positions, and identifies the obtained position as the position of the feature. For each feature whose position is identified, the map update unit 45 includes information indicating the type and the identified position of the feature in the map to generate or update the map.

Regarding feature data received from the vehicles 2 whose data has positional accuracy not satisfying the accuracy condition, the map update unit 45 corrects the positions of the feature, using the correction information set for the vehicles 2, and then uses the corrected positions for obtaining the weighted average. More specifically, the map update unit 45 corrects the positions of the feature included in the feature data by moving theses positions in the direction and by the distance indicated by the correction information relative to the travel direction of the vehicle 2 included in the feature data.

FIG. 7 is an operation flowchart of the map update process in the server 3. The processor 34 of the server 3 executes the map update process in accordance with this operation flowchart at predetermined intervals.

The data receiving unit 41 of the processor 34 receives feature data of a predetermined road section from each vehicle 2, and stores the feature data in the storage device 32 (step S101). For each vehicle 2, the accuracy measurement unit 42 of the processor 34 measures the accuracy of the position of a feature indicated by feature data, based on the difference between the position of the feature indicated by the received individual feature data and the reference position of a corresponding reference feature (step S102).

The contribution setting unit 43 of the processor 34 sets contribution for each vehicle 2 so that contribution of feature data received from a vehicle 2 whose feature data has positional accuracy not satisfying the accuracy condition will be lower than contribution of feature data received from a vehicle 2 whose data has positional accuracy satisfying the accuracy condition (step S103). Additionally, for each vehicle 2 whose data has positional accuracy not satisfying the accuracy condition, the correction information setting unit 44 of the processor 34 sets correction information so that the difference between the position of the feature indicated by the individual feature data of the predetermined road section and the reference position of the corresponding reference feature will decrease (step S104).

The map update unit 45 of the processor 34 identifies the position of the feature indicated by the feature data received from the vehicles 2, using the contribution set for each vehicle 2 and the correction information set for the vehicles 2 whose data has positional accuracy not satisfying the accuracy condition (step S105). The map update unit 45 then includes the identified position and the type of the feature in the map to generate or update the map (step S106). Thereafter, the processor 34 terminates the map update process.

As has been described above, the apparatus for updating a map collects feature data including an estimated position of a feature in a predetermined road section, where a reference position of the feature is determined, from individual vehicles traveling on the road section. For each vehicle, the apparatus measures the accuracy of the position of the feature indicated by feature data obtained by the vehicle, based on the difference between the estimated position of the feature indicated by individual feature data and the reference position of a corresponding feature, and determines whether the positional accuracy satisfies a predetermined accuracy condition. The apparatus then makes contribution to update of map information of feature data received from a vehicle whose data has positional accuracy not satisfying the accuracy condition be lower than contribution of feature data received from a vehicle whose data has positional accuracy satisfying the accuracy condition. In this way, the apparatus decreases contribution to the map to be generated or updated of feature data received from a vehicle whose feature data has low positional accuracy, and thus can improve the positional accuracy of features represented in the map.

It is supposed that two or more vehicles 2 of the same model are equipped with a camera of the same type mounted at the same position so as to capture images in the same direction. Thus, according to a modified example, the parameters of the camera 11 may be set on a vehicle model by vehicle model basis rather than on a vehicle-by-vehicle basis. In this case, the data acquisition device 14 of each vehicle 2 may include identifying information of the model of the vehicle 2 in feature data. Alternatively, the storage device 32 of the server 3 may store the identifying information of the models of the respective vehicles 2 together with the identifying information of the vehicles 2.

In this case, the accuracy measurement unit 42 executes, for each model of vehicle, a process similar to that in the embodiment on feature data of the predetermined road section received from vehicles belonging to the model to measure the positional accuracy for each model. The contribution setting unit 43 also executes a process similar to that in the embodiment for each model of vehicle to set contribution for each model. Additionally, the correction information setting unit 44 executes a process similar to that in the embodiment for each model of vehicle whose data has positional accuracy not satisfying the accuracy condition to set correction information for the model of vehicle.

According to this modified example, the apparatus for updating a map sets contribution and correction information on a vehicle model by vehicle model basis rather than on a vehicle-by-vehicle basis, and thus can facilitate management of the contribution and the correction information.

The condition of the environment around a vehicle 2 at the time of generation of feature data may affect the positional accuracy of features. For example, a decrease in intensity of received GPS signals caused by the environment around by a vehicle 2 decreases the estimation accuracy of the position of the vehicle 2, which also decreases the positional accuracy of features. Thus, in the above-described embodiment or modified examples, the data acquisition device 14 provided on each vehicle 2 may include information indicating the environment around the vehicle 2 at the time of generation of feature data (e.g., weather and atmospheric temperature) in the feature data. In this case, the data acquisition device 14 obtains the information indicating the environment around the vehicle 2, based on, for example, a sensor signal from a temperature sensor provided on the vehicle 2 or information on the weather around the current position of the vehicle 2 received via the wireless communication terminal 13. For each vehicle 2, the accuracy measurement unit 42 of the apparatus executes a process similar to that in the embodiment on feature data of the predetermined road section received from the vehicle on an environmental condition by environmental condition basis to measure the positional accuracy depending on the environment regarding the vehicle. For each vehicle 2, the contribution setting unit 43 also executes a process similar to that in the embodiment on an environmental condition by environmental condition basis to set contribution depending on the environment for the vehicle. Additionally, the correction information setting unit 44 executes a process similar to that in the embodiment for each vehicle and environmental condition in which the positional accuracy does not satisfy the accuracy condition, to set correction information depending on the environment for the vehicle.

According to this modified example, the apparatus for updating a map sets contribution and correction information in view of the environmental condition as well as the parameters of the camera of each vehicle, and thus can further improve the positional accuracy of features represented in the map.

In the above-described embodiment or modified examples, the process of either the contribution setting unit 43 or the correction information setting unit 44 may be omitted. When the process of the contribution setting unit 43 is omitted, the same contribution may be set for each vehicle, model of vehicle, or environmental condition regardless of the positional accuracy of features. Even in this case, the apparatus can improve the positional accuracy of features represented in the map because the positions of features are corrected, using the correction information, regarding feature data obtained from a vehicle or under an environmental condition in which the positional accuracy not satisfying the accuracy condition. Even when the process of the correction information setting unit 44 is omitted, the apparatus can improve the positional accuracy of features represented in the map because the contribution of feature data obtained from a vehicle or under an environmental condition in which the positional accuracy does not satisfy the accuracy condition is set relatively low.

The computer program for causing a computer to achieve the functions of the units included in the processor of the apparatus for updating a map according to the embodiment or modified examples may be provided in a form recorded on a computer-readable recording medium. The computer-readable recording medium may be, for example, a magnetic recording medium, an optical recording medium, or a semiconductor memory.

As described above, those skilled in the art may make various modifications according to embodiments within the scope of the present invention.

What is claimed is:

1. An apparatus for updating a map, comprising:
a communication circuit;
a memory storing one or more instructions; and
one or more processors configured to execute the one or more instructions stored in the memory,
wherein the one or more instructions, when executed by the one or more processors, cause the apparatus to:
transmit, over a wireless network via the communication circuit and a base station in communication with a vehicle, a downlink radio signal to the vehicle, the downlink radio signal including an instruction that controls the vehicle to collect feature data,
receive, over the wireless network via the base station and the communication circuit, an uplink radio signal from the vehicle traveling on a predetermined road section, the uplink radio signal including the feature data for a feature in the road section related to travel of vehicles, the feature data indicating a position of the feature in the road section, the feature data obtained based on an output of a neural network trained to identify the feature from an image captured by a camera mounted on the vehicle,
measure an accuracy of the position of the feature indicated by the feature data based a difference between the position of the feature indicated by the received feature data and a reference position of a corresponding feature,
determine whether the accuracy satisfies a predetermined accuracy condition,
set a contribution of the feature data received from the vehicle to update of map information indicating the position of the feature, the contribution being set to a first weight value when the accuracy does not satisfy the accuracy condition and a second weight value when the accuracy satisfies the accuracy condition, wherein the second weight value is higher than the first weight value, wherein the feature data provides a higher contribution to the map that changes the map to a higher degree with the second weight value than the first weight value, wherein the first weight value and the second weight value are greater than or equal to zero,
based on a determination that the accuracy does not satisfy the accuracy condition, set correction information for correcting the position of the feature indicated by feature data obtained by the vehicle, the correction information being set so that the difference between the position of the feature indicated by the received feature data and the reference position of a corresponding feature is decreased, generate or update the map, for autonomous control of the vehicle, based on the feature data, the set contribution of the feature data, and the set correction information, and transmit the generated or updated map to the vehicle, wherein driving of the vehicle is autonomously controlled in accordance with the generated or updated map, wherein the feature in the road section is expressed as a probability distribution of reliability of the position of the feature, and wherein the predetermined accuracy condition is satisfied based on determining that the difference between the position of the feature indicated by the received feature data and the reference position of the corresponding feature is not greater than a predetermined distance threshold expressed as a Mahalanobis distance.

2. The apparatus according to claim 1, wherein for a model of vehicle, the processors measure the accuracy of the position of the feature, based on the difference between the position of the feature indicated by the individual feature data received from a plurality of vehicles belonging to the model and the reference position of a corresponding feature, the plurality of vehicles traveling on the predetermined road section, and set the contribution for the model of vehicle, based on the accuracy of the position of the feature regarding the model of vehicle.

3. The apparatus according to claim 1, wherein the feature data further includes information indicating environment around the vehicle at the time of generation of the feature data, wherein the one or more instructions, when executed by the one or more processors, cause the apparatus to: measure the accuracy depending on the environment regarding the vehicle, and set the contribution depending on the environment, based on the accuracy depending on the environment regarding the vehicle.

4. A method for updating a map, comprising:

transmitting, over a wireless network via a communication circuit and a base station in communication with a vehicle, a downlink radio signal to the vehicle, the downlink radio signal including an instruction that controls the vehicle to collect feature data, receiving, over the wireless network via the base station and the communication circuit, an uplink radio signal from the vehicle traveling on a predetermined road section, the uplink radio signal including the feature data for a feature in the road section related to travel of vehicles, the feature data indicating a position of the feature in the road section, the feature data obtained based on an output of a neural network trained to identify the feature from an image captured by a camera mounted on the vehicle;

measuring an accuracy of the position of the feature indicated by the feature data based a difference between the position of the feature indicated by the received feature data and a reference position of a corresponding feature;

determining whether the accuracy satisfies a predetermined accuracy condition;

setting a contribution of the feature data received from the vehicle to update of map information indicating the position of the feature, the contribution being set to a first weight value when the accuracy does not satisfy the accuracy condition and a second weight value when the accuracy satisfies the accuracy condition, wherein the second weight value is higher than the first weight value, wherein the feature data provides a higher contribution to the map that changes the map to a higher degree with the second weight value than the first weight value, wherein the first weight value and the second weight value are greater than zero;

based on determining that the accuracy does not satisfy the accuracy condition, set correction information for correcting the position of the feature indicated by feature data obtained by the vehicle, the correction information being set so that the difference between the position of the feature indicated by the received feature data and the reference position of a corresponding feature is decreased;

generating or updating the map, for autonomous control of the vehicle, based on the feature data, the set contribution of the feature data, and the second correction information; and transmitting the generated or updated map to the vehicle, wherein driving of the vehicle is autonomously controlled in accordance with the generated or updated map, wherein the feature in the road section is expressed as a probability distribution of reliability of the position of the feature, and wherein the predetermined accuracy condition is satisfied based on determining that the difference between the position of the feature indicated by the received feature data and the reference position of the corresponding feature is not greater than a predetermined distance threshold expressed as a Mahalanobis distance.

5. The method according to claim 4, wherein for a model of vehicle, the accuracy of the position of the feature is measured based on the difference between the position of the feature indicated by the individual feature data received from a plurality of vehicles belonging to the model and the reference position of a corresponding feature, the plurality of vehicles traveling on the predetermined road section, and the contribution for the model of vehicle is set based on the accuracy of the position of the feature regarding the model of vehicle.

6. The method according to claim 4, wherein the feature data further includes information indicating environment around the vehicle at the time of generation of the feature data, wherein the method further comprises:

measuring the accuracy depending on the environment regarding the vehicle, and set the contribution depending on the environment, based on the accuracy depending on the environment regarding the vehicle.

7. A non-transitory computer readable recording medium having instructions stored therein, which when executed by a processor cause the process to execute a method for updating a map, the method comprising:

transmitting, over a wireless network via a communication circuit and a base station in communication with a vehicle, a downlink radio signal to the vehicle, the downlink radio signal including an instruction that controls the vehicle to collect feature data, receiving, over the wireless network via the base station and the communication circuit, an uplink radio signal from the vehicle traveling on a predetermined road section, the uplink radio signal including the feature data for a feature in the road section related to travel of vehicles, the feature data indicating a position of the feature in the road section;

measuring an accuracy of the position of the feature indicated by the feature data, based a difference between the position of the feature indicated by the received feature data and a reference position of a corresponding feature;

determining whether the accuracy satisfies a predetermined accuracy condition;

setting a contribution of the feature data received from the vehicle to update of map information indicating the position of the feature, the contribution being set to a first weight value when the accuracy does not satisfy the accuracy condition and a second weight value when the accuracy satisfies the accuracy condition, wherein the second weight value is higher than the first weight value, wherein the feature data provides a higher contribution to the map that changes the map to a higher degree with the second weight value than the first weight value, wherein the first weight value and the second weight value are greater than zero;

based on determining that the accuracy does not satisfy the accuracy condition, set correction information for correcting the position of the feature indicated by feature data obtained by the vehicle, the correction information being set so that the difference between the position of the feature indicated by the received feature data and the reference position of a corresponding feature is decreased;

generating or updating the map, for autonomous control of the vehicle, based on the feature data, the set contribution of the feature data, and the second correction information; and transmitting the generated or updated map to the vehicle, wherein driving of the vehicle is autonomously controlled in accordance with the generated or updated map, wherein the feature in the road section is expressed as a probability distribution of reliability of the position of the feature, and wherein the predetermined accuracy condition is satisfied based on determining that the difference between the position of the feature indicated by the received feature data and the reference position of the corresponding feature is not greater than a predetermined distance threshold expressed as a Mahalanobis distance.

* * * * *